United States Patent [19]

Sano

[11] Patent Number: 5,193,112
[45] Date of Patent: Mar. 9, 1993

[54] ARRANGEMENT AND METHOD FOR RAPIDLY DETECTING DOUBLE TALK IN LONG DISTANCE TELEPHONE COMMUNICATIONS SYSTEM

[75] Inventor: Hideo Sano, Tokyo, Japan

[73] Assignee: NEC Corporation, Tokyo, Japan

[21] Appl. No.: 645,905

[22] Filed: Jan. 24, 1991

[30] Foreign Application Priority Data

Jan. 24, 1990 [JP] Japan ................................. 2-14250

[51] Int. Cl.$^5$ ............................................. H04B 3/20
[52] U.S. Cl. ................................. 379/410; 370/32.1; 379/406
[58] Field of Search ..................... 379/406, 410, 411; 370/32, 32.1

[56] References Cited

U.S. PATENT DOCUMENTS

| 4,587,382 | 5/1986 | Yang | 370/32.1 |
| 4,621,172 | 11/1986 | Kanemasa et al. | 370/32.1 |
| 4,918,727 | 4/1990 | Rohrs et al. | 379/410 |

FOREIGN PATENT DOCUMENTS 27325  1/1989  Japan .

Primary Examiner—James L. Dwyer
Assistant Examiner—M. Shehata
Attorney, Agent, or Firm—Sughrue, Mion, Zinn, Macpeak & Seas

[57] ABSTRACT

Double talk is rapidly detected for effectively preventing degradation of echo cancellation in a long distance telephone communications system. An echo estimator includes a transversal filter and receives an incoming signal and tap coefficients, and then adaptively produces an estimated echo signal. A subtractor is adapted to subtract the estimated echo signal from an echo signal applied thereto, and outputting an error signal indicating residual echo. A tap coefficient updating circuit is coupled to receive the error signal and the incoming signal and the tap coefficients, and renews the tap coefficients. A double talk detector is coupled to receive the error signal and the incoming signal and the echo signal. The double talk detector issues a double talk detection signal in the event that a cross-correlation value between the incoming and echo signals is less than a first predetermined level while an estimated echo cancellation is larger than a second predetermined level.

11 Claims, 4 Drawing Sheets

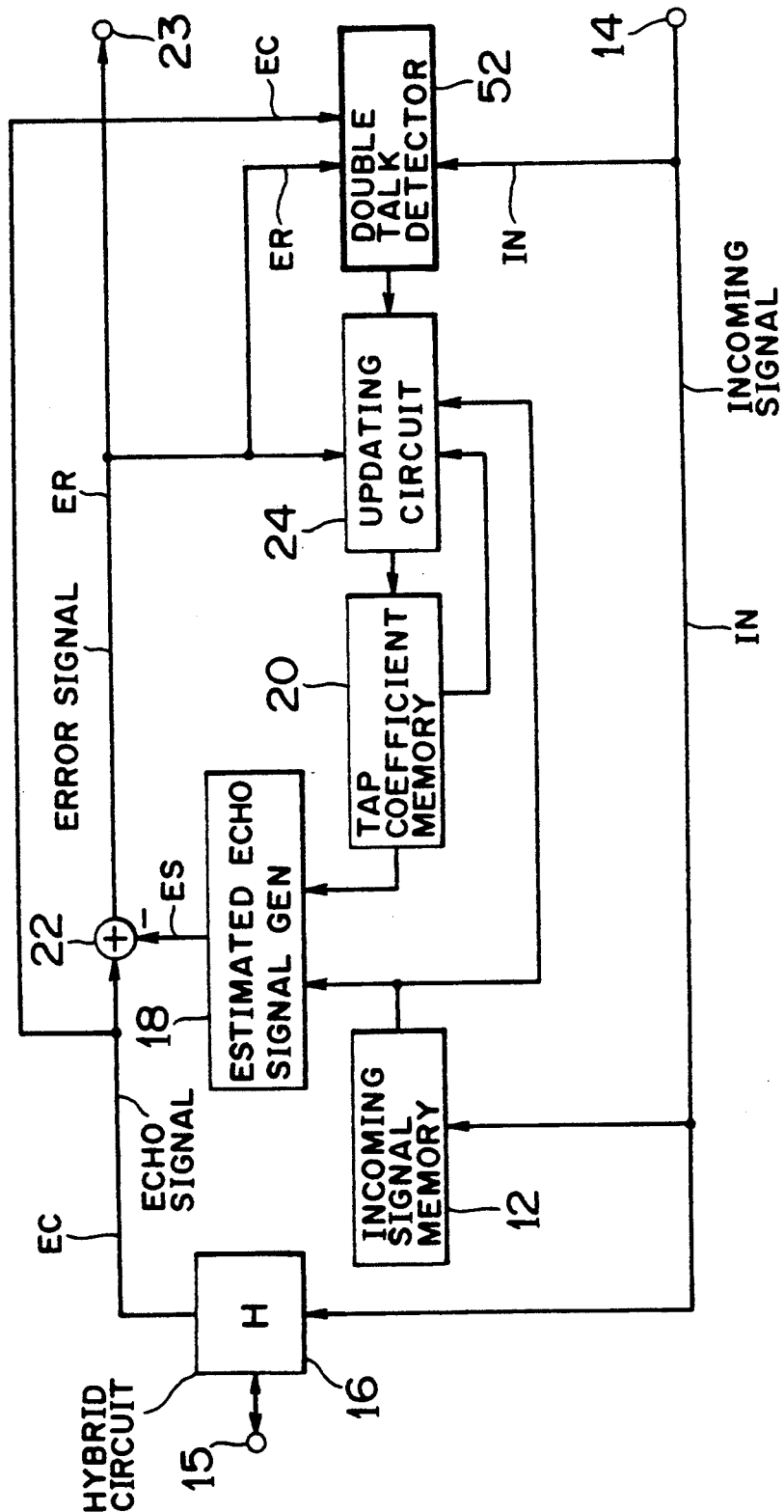

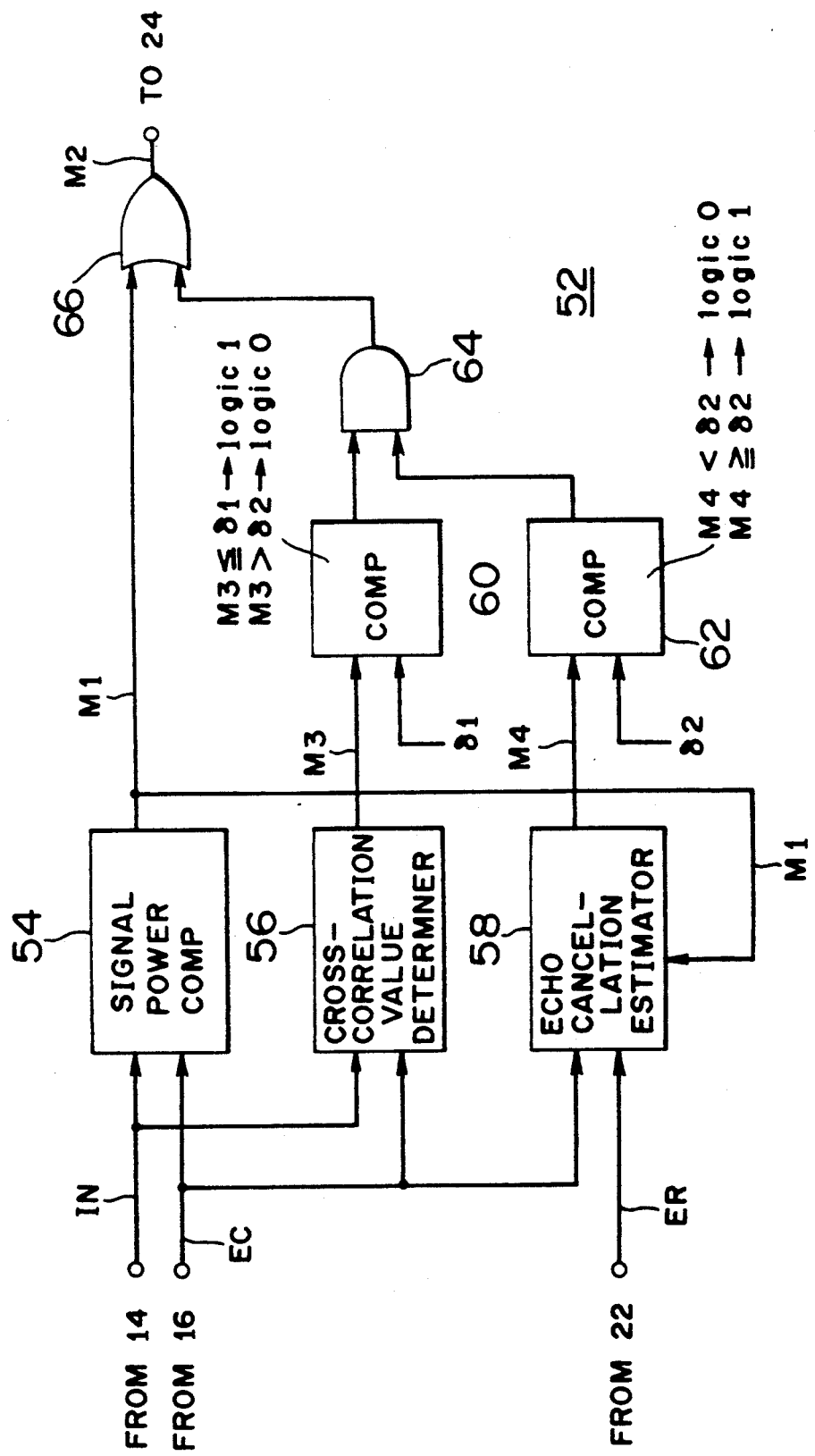

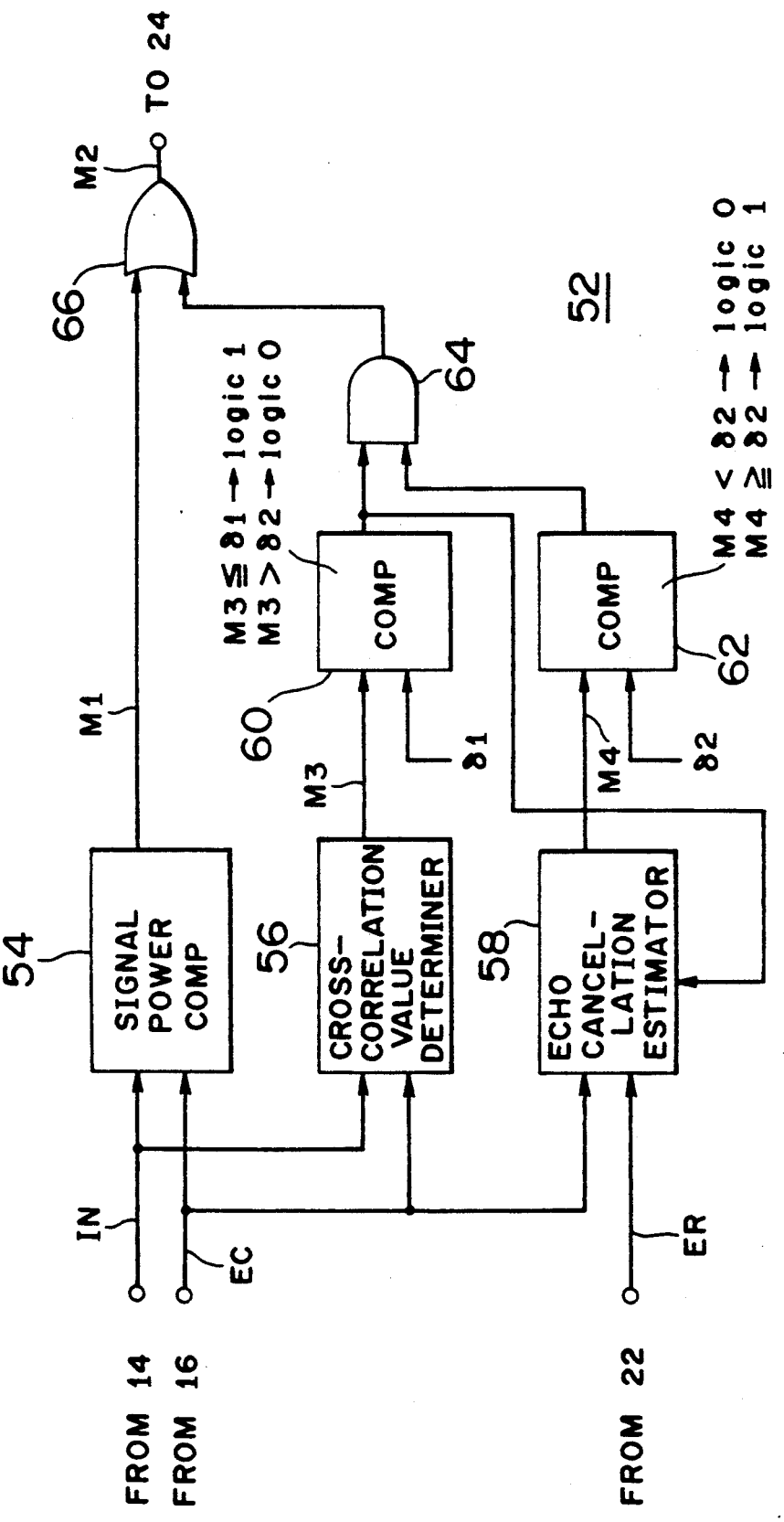

ARRANGEMENT AND METHOD FOR RAPIDLY DETECTING DOUBLE TALK IN LONG DISTANCE TELEPHONE COMMUNICATIONS SYSTEM

BACKGROUND OF THE INVENTION

1. Field of the Invention

The present invention relates to an arrangement and a method for detecting so-called double talk in a long distance telephone communications system, and more specifically to such an arrangement and a method which effectively prevent degradation of echo cancellation by rapidly detecting double talk.

2. Description of the Prior Art

A long distance telephone communications system has been constantly plagued by "echo". A known approach to solving this problem is the use of an echo canceller or echo suppressor using an echo estimator which takes the form of a digital transversal filter.

However, when both parties talk simultaneously, i.e., during double talk, the echo canceller is no longer able to effectively block echo signals. This is because the echo signals are included in near-end party's signals to be transmitted. Accordingly, it is a current practice to provide a double talk detector. More specifically, when the double talk is detected, updating of tap-coefficients of the transversal filter is terminated in order to prevent the echo cancellation from being undesirably lessened.

Before turning to the instant invention, it is deemed advantageous to briefly discuss a known echo canceller, which includes a double talk detector, with reference to FIG. 1. An arrangement similar to the echo canceller shown in FIG. 1, has been disclosed in Japanese Patent Application published under publication No. 64-27325 on Jan. 30, 1989.

As shown in FIG. 1, the known echo canceller denoted by reference numeral 10, includes an incoming signal memory 12 which is arranged to memorize an incoming signal IN applied via an input terminal 14. The incoming signal IN is also applied to a 4-wire to 2-wire hybrid circuit 16. An estimated echo signal generator 18, taking the form of digital filter (viz., convolution arithmetic circuit), is supplied with the incoming signal IN stored in the memory 12 and also supplied with tap coefficients from a tap coefficient memory 20. A subtracter 22 receives an echo signal EC routed towards a far end and further receives an estimated echo signal ES from the estimated echo signal generator 18. The subtracter 22 subtracts out the echo signal. A tap coefficient updating circuit 24 receives an error signal (viz., residual echo signal) ER outputted from the subtracter 22, the current tap coefficients from the memory 20 and the incoming signal IN stored in the memory 12, and then updates the tap coefficients stored in the memory 20 in order to render the error signal ER zero. During the double talk, a near end party's signal is added, by way of a terminal 15 and the hybrid circuit 16, to the echo signal EC. An echo signal and/or a near end party's signal are applied to a far end equipment through an output terminal 23.

During the double talk, since the near-end party's signal is added to the echo signal EC, the error signal ER undesirably increases and accordingly disturbs the tap coefficients. This means that an effective echo cancellation is no longer expected. In order to overcome such a problem, a double talk detector 30 is provided to ascertain or detect the double talk and terminates the updating of tap coefficients at the circuit 24.

The double talk detecting unit 30 includes an echo signal power detector 32, an error signal power detector 34, two comparators 36, 38, and an incoming signal power detector 40, all of which are coupled as shown. The power detector 32 is coupled to detect signal power of the echo signal EC, which is denoted by EC'. On the other hand, the power detectors 34, 40 are coupled to detect each power energy of the error and incoming signals ER and IN respectively, and produce the outputs ER' and IN' which respectively indicate the power of ER and the power of IN. In the event that the signal power EC' is larger than the signal power IN', the comparator 36 outputs a signal DT1 indicative of the double talk. The tap coefficient updating circuit 24 terminates the operation thereof in response to the signal DT1. Similarly, if the signal power ER' is larger than the signal power IN', then the comparator 38 outputs a signal DT2 indicative of the double talk. The tap coefficient updating circuit 24 also terminates the operation thereof in response to the signal DT2. The double talk detector 30 can be modified in a manner which responds to one of the two signals DT1, DT2.

However, the aforesaid known technique has encountered the problem in that the signal power detection requires a somewhat long time duration and hence it is practically impossible to detect immediately after the double talk occurs. Accordingly, the tap coefficients are disturbed and hence the echo cancellation is lowered with degrading speech quality. Further, the above-mentioned prior art is also unable to detect an instantaneous noise involved in the echo signal, and hence speech quality is also undesirably lowered.

SUMMARY OF THE INVENTION

It is an object of the present invention to provide an arrangement which features a rapid detection of occurrence of double talk and hence is able to effectively prevent degradation of speech quality.

Another object of the present invention is to provide a method which features a rapid detection of occurrence of double talk and hence is able to effectively prevent degradation of speech quality.

In brief, the above object is achieved by an arrangement wherein double talk is rapidly detected for effectively preventing degradation of echo cancellation in a long distance telephone communications system. An echo estimator includes a transversal filter and receives an incoming signal and tap coefficients, and then adaptively produces an estimated echo signal. A subtractor is adapted to subtract the estimated echo signal from an echo signal applied thereto, and outputting an error signal indicating residual echo. A tap coefficient updating circuit is coupled to receive the error signal and the incoming signal and the tap coefficients, and renews the tap coefficients. A double talk the incoming signal and the echo signal. The double talk detector issues a double talk detection signal in the event that a cross-correlation value between the incoming and echo signals is less than a first predetermined level while an estimated echo cancellation is larger than a second predetermined level.

More specifically a first aspect of the present invention comes in an arrangement of cancelling an echo signal in a telephone communications system, comprising: an echo estimator including a transversal filter, the echo estimator receiving an incoming signal and tap coefficients and adaptively producing an estimated echo signal; a subtractor coupled to the echo estimator, the subtractor being adapted to subtract the estimated echo signal from the echo signal applied thereto, the subtractor outputting an error signal indicating residual echo; a tap coefficient memory for storing the tap coefficients; a tap coefficient updating circuit coupled to receive the error signal and the incoming signal and the tap coefficients, the tap coefficient updating circuit applying renewed tap coefficients to the tap coefficient memory; a double talk detector coupled to receive the error signal and the incoming signal and the echo signal, the double talk detector producing a double talk detection signal in the event that a cross-correlation value between the incoming and echo signals is less than a first predetermined level while an estimated echo cancellation is larger than a second predetermined level.

A second aspect of the present invention comes in an arrangement of cancelling an echo signal in a telephone communications system, comprising: an echo estimator including a transversal filter, the echo estimator receiving an incoming signal and tap coefficients and adaptively producing an estimated echo signal; a subtractor coupled to the echo estimator, the subtractor being adapted to subtract the estimated echo signal from the echo signal applied thereto, the subtractor outputting an error signal indicating residual echo; a tap coefficient memory for storing the tap coefficients; a tap coefficient updating circuit coupled to receive the error signal and the incoming signal and the tap coefficients, the tap coefficient updating circuit applying renewed tap coefficients to the tap coefficient memory; a double talk detector coupled to receive the error signal and the incoming signal and the echo signal, the double talk detector producing a first double talk detection signal in the event that a cross-correlation value between the incoming and echo signals is less than a first predetermined level while an estimated echo cancellation is larger than a second predetermined level, and the double talk detector also producing a second double talk detection signal when signal power of the echo signal is greater than signal power of the incoming signal.

A third aspect of the present invention comes in a method for cancelling an echo signal in a telephone communications system, comprising the steps: (a) receiving an incoming signal and tap coefficients previously stored in a tap coefficient memory and adaptively producing an estimated echo signal using a transversal filter; (b) subtracting the estimated echo signal from the echo signal, and outputting an error signal indicating residual echo; (c) receiving the error signal and the incoming signal and the tap coefficients, updating the tap coefficients stored in the tap coefficient memory; (d) receiving the error signal and the incoming signal and the double talk detector, and producing a double talk detection signal in the event that a cross-correlation value between the incoming and echo signals is less than a first predetermined level while an estimated echo cancellation is larger than a second predetermined level.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 2 is a block diagram showing a preferred embodiment of the present invention;

FIG. 3 is a block diagram showing details of a selected block from the FIG. 2 arrangement; and FIG. 4 is a block diagram showing a variant of the FIG. 3 arrangement.

DETAILED DESCRIPTION OF THE PREFERRED EMBODIMENTS

Figure 1:
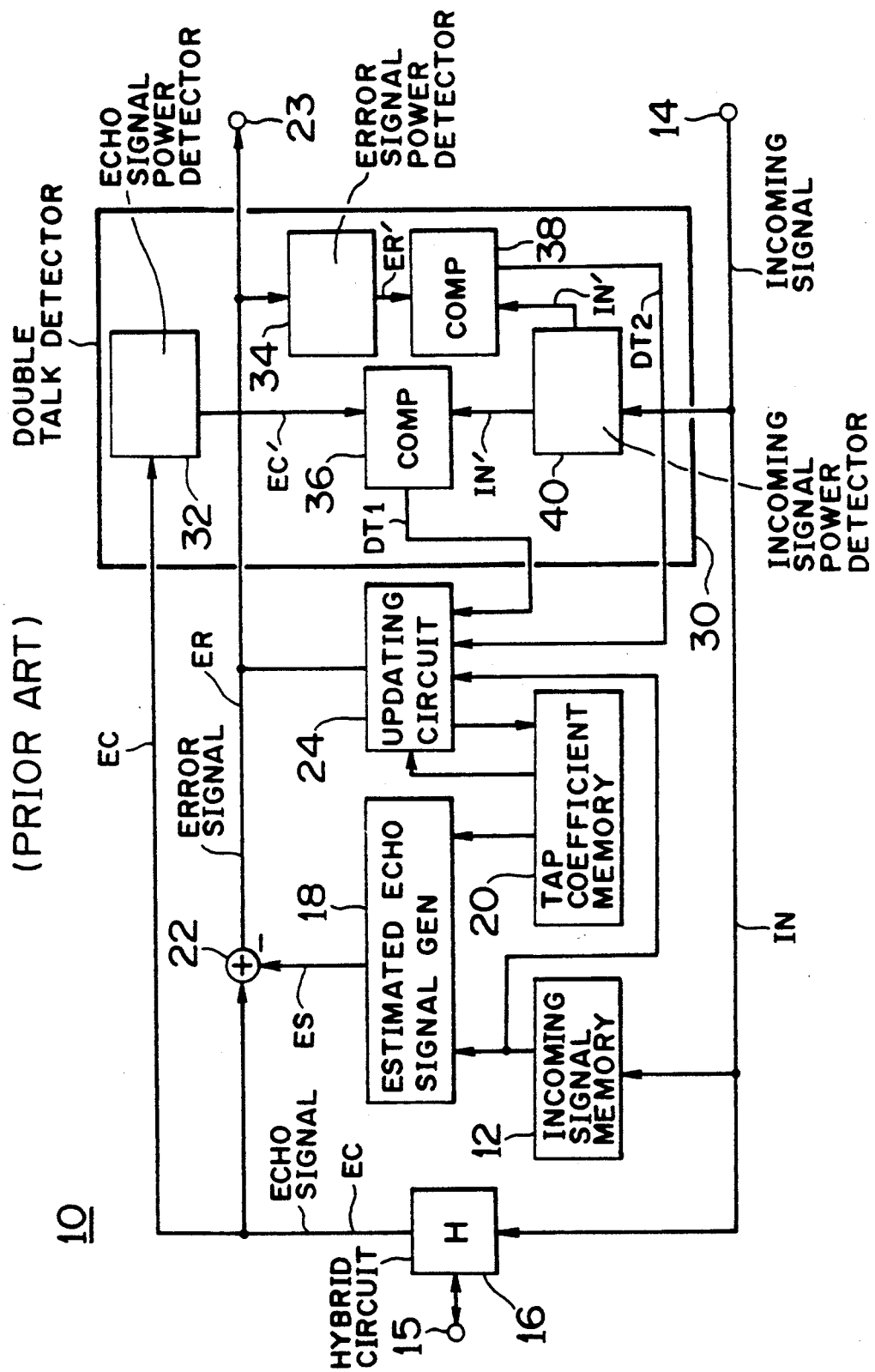
FIG. 1 is a block diagram showing a prior art arrangement for detecting double talk, referred to in the opening paragraphs.

A preferred embodiment of the present invention will be discussed with reference to FIGS. 2 and 3.

FIG. 2 shows an echo canceller 50 which includes an improved double talk detector 52 according to the present invention, the detail of which is illustrated in block diagram form in FIG. 3. The echo canceller 50 is identical with the counterpart 10 (FIG. 1) except that the double talk detector 52 is different in arrangement as shown in FIG. 3. Accordingly, further description of the FIG. 2 arrangement will be omitted for brevity.

Referring now to FIG. 3, the double talk detector 52 includes a signal power comparator 54, a cross-correlation value determiner 56, an echo cancellation estimator 58, two comparators 60 and 62, an AND gate 64 and an OR gate 66.

The signal power comparator 54 is supplied with the incoming signal IN and the echo signal EC which are respectively applied from the input terminal 14 and the hybrid circuit 16, and determines the signal power of each of the two signals IN and EC using integrator (for example). Merely for the convenience of descriptions, the power of the incoming signal IN is denoted by IN' while that of the echo signal EC is denoted by EC'. Following this, the signal power comparator 54 compares the power EC' with the power IN'. Generally, the signal power IN' is greater than the signal power EC' even in the case of double talk, and hence it is preferable to lower the power IN' by multiplying same by 0.5 (for example) before comparison. In the event that the signal power EC' is greater than the power IN', the comparator 54 generates a signal M1 assuming a logic 1 which indicates the presence of the double talk. Therefore, the OR gate 66 applies a signal M2 assuming a logic 1 which indicates the presence of double talk. In response to the signal M2 assuming a logic 1, the tap coefficient circuit 24 (FIG. 2) terminates the operation thereof. On the contrary, if the signal power EC' does not reach the signal power IN', the output of the comparator 54 (viz., M1) assumes a logic 0 which indicate single talk.

The determiner 56 cross-correlates the two signals IN, EC applied thereto, and evaluates the cross-correlation value and outputs same which is denoted by M3. The comparator 60 is arranged to compare the output M3 and a threshold level δ1. In the event that the output M3 is equal to or less than the threshold level δ1, the comparator 60 issues a logic 1 which indicates the presence of double talk. Otherwise, viz., if the output M3 exceeds the threshold level δ1, the comparator 60 outputs a logic 0 indicating single talk. Although the presence of the double talk is detected at the determiner 56, the output M3 is not the output of the double talk detector 52. Accordingly, the output M3 itself is unable to terminate the operation of the tap coefficient updating circuit 24.

On the other hand, the echo cancellation estimator 58 is supplied with the echo signal EC and the error signal ER. The estimator 58 determines the signal power of each of the signals EC and ER (denoted by EC' and ER' respectively) by integrating them, after which a difference between the two signal powers EC' and ER' is derived and then applied to the comparator 62. The error signal ER is applied to the estimator 58 from the subtractor 22 (FIG. 2). The output of the estimator 58 is represented by M4. If the output M4 is equal to or greater than the threshold level δ2, the comparator 62 produces a logic 1 which indicates the presence of double talk. Otherwise, the comparator 62 issues a logic 0 indicating single talk. Although the presence of the double talk is detected at the estimator 58, the output M4 is not the output of the double talk detector 52. Accordingly, the output M4 itself is unable to terminate the operation of the tap coefficient updating circuit 24.

It is understood that the AND gate 64 issues a logic 1 in the event that (a) the output M3 is equal to or less than δ1 and simultaneously (b) the output M4 is equal to or larger than δ2. More specifically, while the echo cancellation is effectively carried out and hence the output M4 is equal to or larger than the threshold value δ2, the double talk detection is overruled by the cross-correlation value estimator 56. This is because the determiner 56 is able to detect the double talk much faster than the signal power comparator 54.

It is also understood that while the echo cancellation value is small such that the output M4 is less than the threshold level δ2, the comparator 62 continues to generate a logic 0 and therefore the output of the AND gate 64 remains a logic 0 irrespective of the value of the output M3. In this case, the double talk detection is performed only by the signal power comparator 54.

When the double talk occurs, the echo cancellation is rapidly lowered with lowering the output M4. Therefore, after the double talk terminates, it takes a long time for the output M4 restores the value immediately before the occurrence of the double talk. This means that the output of the comparator 62 is undesirably delayed in generating a logic 1 after the double talk terminates. In other words, the quick double talk detection by the cross-correlation value determiner 56 is prevented. In order to overcome this difficulty, the output M1 is also applied to the echo cancellation estimator 58. When the output M1 assumes a logic 1, the estimator 58 terminates the operation and holds the estimated value until being supplied with the output M1 assuming a logic 0.

FIG. 4 shows a variant of the FIG. 3 arrangement, wherein the echo cancellation estimator 58 is supplied with the output of the comparator 60 instead of M1. As previously mentioned, the cross-correlation value determiner 56 is able to detect the presence of double talk faster than the signal power comparator 54, and hence the echo cancellation estimator 58 quickly holds the output M4 upon detection of double talk as compared with the FIG. 3 arrangement. Further, the determiner 56 also rapidly is capable of detecting the termination of double talk relative to the signal power detector 54 and as such the comparator 62 is rendered to produce a logic 1 in the case where the output of the comparator 60 is rapidly applied to the echo cancellation estimator 58.

In the above discussion, the FIG. 2 arrangement includes the 2-wire to 4-wire hybrid circuit 16. However, the present invention is also applicable to a hands-free automobile telephone terminal and a videotelephone apparatus, etc., wherein the hybrid circuit 16 is not used and wherein sound waves reproduced by a loudspeaker is liable to enter a microphone as an echo signal.

While the foregoing description described one preferred embodiment with one variant according to the present invention, the various alternatives and modifications possible without departing from the scope of the present invention, which is limited only by the appended claims, will be apparent to those skilled in the art.

What is claimed is:

1. An echo canceller for cancelling an echo signal in a telephone communications system, comprising:
   an echo estimator including a transversal filter, said echo estimator receiving an incoming signal and adaptively producing an estimate echo signal;
   a subtractor coupled to said echo estimator, said subtractor subtracting said estimated echo signal from the echo signal applied thereto, said subtractor outputting an error signal indicating residual echo;
   a tap coefficient memory for storing tap coefficients and applying said tap coefficients to said echo estimator;
   a tap coefficient updating circuit coupled to receive said error signal and said incoming signal and said tap coefficients, said tap coefficient updating circuit applying renewed tap coefficients to said tap coefficient memory;
   a double talk detector coupled to receive said error signal and said incoming signal and said echo signal, said double talk detector producing a double talk detection signal in the event that a cross-correlation value between said incoming and echo signals is less than a first predetermined level while an estimated echo cancellation is larger than a second predetermined level.

2. An echo canceller as claimed in claim 1, wherein said double talk detector includes:
   first means, said first means being coupled to receive said incoming signal and said echo signal and deriving said cross-correlation value therebetween, said first means outputting the cross-correlation value derived;
   second means, said second means being coupled to receive said cross-correlation value and compares same with said first predetermined level, said second means outputting a signal assuming a first logic state in the event that said cross-correlation value is less than said first predetermined level;
   third means, said third means being coupled to receive said echo signal and said error signal, said third means estimating an echo cancellation and outputting the estimated echo cancellation signal;
   fourth means, said fourth means being coupled to receive said estimated echo cancellation signal and compares same with said second predetermined level, said fourth means outputting a signal assuming a first logic state in the event that the estimated echo cancellation is larger than said second predetermined level;
   fifth means, said fifth means being coupled to receive the outputted signals of said second and fourth means, and producing said double talk detection signal in the event that each of the outputted signals of said second and fourth means assumes the first logic state.

3. An echo canceller as claimed in claim 2, wherein said third means is coupled to receive the signal produced from said second means, said third means terminating the operation thereof in response to the signal applied from said second means assuming said first logic state.

4. An echo canceller as claimed in claim 1, wherein said double talk detector also produces a double talk detection signal when signal power of said echo signal is greater than signal power of said incoming signal.

5. An echo canceller as claimed in claim 4, wherein said double talk detector includes:
- a signal power comparator coupled to receive said incoming signal and said echo signal and detecting signal power thereof, said signal power comparator compares the signal power of each of said incoming and echo signals, said signal power comparator outputting the double talk detection signal in the event that the signal power of said echo signal is larger than the signal power of said incoming signal.

6. An echo canceller for cancelling an echo signal in a telephone communications system, comprising:
- an echo estimator including a transversal filter, said echo estimator receiving an incoming signal and tap coefficients and adaptively producing an estimated echo signal;
- a subtractor coupled to said echo estimator, said subtractor substracting said estimated echo signal from the echo signal applied thereto, said subtractor outputting an error signal indicating residual echo;
- a tap coefficient memory for storing said tap coefficients;
- a tap coefficient updating circuit coupled to receive said error signal and said incoming signal and said tap coefficients, said tap coefficient updating circuit applying renewed tap coefficients to said tap coefficient memory;
- a double talk detector coupled to receive said error signal and said incoming signal and said echo signal, said double talk detector producing a first double talk detection signal in the event that a cross-correlation value between said incoming and echo signals is less than a first predetermined level while an estimated echo cancellation is larger than a second predetermined level, and said double talk detector also producing a second double talk detection signal when signal power of said echo signal is greater than signal power of said incoming signal.

7. An echo canceller as claimed in claim 6, wherein said double talk detector includes:
- first means, said first means being coupled to receive said incoming signal and said echo signal and deriving said cross-correlation value therebetween, said first means outputting the cross-correlation value derived;
- second means, said second means being coupled to receive said cross-correlation value and compares same with said first predetermined level, said second means outputting a signal assuming a first logic state in the event that said cross-correlation value is less than said first predetermined level;
- third means, said third means being coupled to receive said echo signal and said error signal, said third means estimating an echo cancellation and outputting the estimated echo cancellation signal;
- fourth means, said fourth means being coupled to receive said estimated echo cancellation signal and compares same with said second predetermined level, said fourth means outputting a signal assuming a first logic state in the event that the estimated echo cancellation is larger than said second predetermined level;
- fifth means, said fifth means being coupled to receive the outputted signals of said second and fourth means, and producing said first double talk detection signal in the event that each of the outputted signals of said second and fourth means assumes the first logic state;
- sixth means, said six means being coupled to receive said incoming signal and said echo signal and detecting signal power thereof, said sixth means comparing the signal power of each of said incoming and echo signals, said sixth means outputting said second double talk detection signal in the event that the signal power of said echo signal is larger than the signal power of said incoming signal.

8. An echo canceller as claimed in claim 7, wherein said third means is coupled to receive the signal produced from said second means, said third means terminating the operation thereof in response to the signal applied from said second means assuming said first logic state.

9. An echo canceller as claimed in claim 7, wherein said third means is coupled to receive said second double talk detection signal, said third means terminating the operation thereof in response to the second double talk detection signal.

10. A method for cancelling an echo signal in a telephone communications system, comprising the steps:
- (a) receiving an incoming signal and tap coefficients previously stored in a tap coefficient memory and adaptively producing an estimated echo signal using a transversal filter;
- (b) subtracting said estimated echo signal from an echo signal, and outputting an error signal indicating residual echo;
- (c) receiving said error signal and said incoming signal and said tap coefficients, and updating the tap coefficients stored in said tap coefficient memory;
- (d) receiving said error signal and said incoming signal and said echo signal, and producing a double talk detection signal in the event that a cross-correlation value between said incoming and echo signals is less than a first predetermined level while an estimated echo cancellation signal, derived from said echo signal and said error signal, is larger than a second predetermined level.

11. A method as claimed in claim 10, wherein said step (d) includes:
- (e) receiving said cross-correlation value and comparing same with said first predetermined level, and outputting a signal assuming a first logic state in the event that said cross-correlation value is less than said first predetermined level;
- (f) receiving said echo signal and said error signal, estimating an echo cancellation and outputting the estimated echo cancellation signal;
- (g) receiving said estimated echo cancellation signal and compares same with said second predetermined level, and outputting a signal assuming a first logic state in the event that the estimated echo cancellation signal is larger than said second predetermined level;
- (h) receiving the signals derived at the steps (e) and (g), and producing said double talk detection signal in the event that each of the outputted signals derived at the steps (e) and (g) assuming the first logic state.

* * * * *

UNITED STATES PATENT AND TRADEMARK OFFICE
CERTIFICATE OF CORRECTION

PATENT NO. : 5,193,112

DATED : March 9, 1993

INVENTOR(S) : Hideo SANO

It is certified that error appears in the above-identified patent and that said Letters Patent is hereby corrected as shown below:

Col. 2, line 57, after "talk", insert --detector is coupled to receive the error signal and--;

Col. 4, line 18, delete "idontical", insert --identical--.

Signed and Sealed this

Twenty-first Day of December, 1993

*Attest:*

BRUCE LEHMAN

*Attesting Officer*  *Commissioner of Patents and Trademarks*